United States Patent
Manikani et al.

(10) Patent No.: US 12,326,532 B2
(45) Date of Patent: Jun. 10, 2025

(54) FEATURE DETECTION IN SEISMIC DATA

(71) Applicant: Schlumberger Technology Corporation, Sugar Land, TX (US)

(72) Inventors: Sunil Manikani, Pune (IN); Karan Pathak, Delhi (IN); Gayatri Novenita, Pune (IN); Hiren Maniar, Houston, TX (US); Aria Abubakar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 364 days.

(21) Appl. No.: 17/768,560

(22) PCT Filed: Oct. 7, 2020

(86) PCT No.: PCT/US2020/070626
§ 371 (c)(1),
(2) Date: Apr. 13, 2022

(87) PCT Pub. No.: WO2021/077127
PCT Pub. Date: Apr. 22, 2021

(65) Prior Publication Data
US 2023/0341577 A1    Oct. 26, 2023

Related U.S. Application Data

(60) Provisional application No. 62/914,608, filed on Oct. 14, 2019.

(51) Int. Cl.
*G01V 1/34* (2006.01)
*G06T 7/11* (2017.01)
*G06T 7/73* (2017.01)

(52) U.S. Cl.
CPC ............... *G01V 1/345* (2013.01); *G06T 7/11* (2017.01); *G06T 7/73* (2017.01); *G06T 2207/20081* (2013.01); *G06T 2207/20101* (2013.01)

(58) Field of Classification Search
None
See application file for complete search history.

(56) References Cited

U.S. PATENT DOCUMENTS 5,056,066 A    10/1991  Howard
9,182,511 B2   11/2015  Neave
(Continued)

OTHER PUBLICATIONS

Harrison, Richard, and John Patrick. Machine learning methods for discriminating natural targets in seabed imagery. Diss. University of East Anglia, 2012. (Year: 2012).*

(Continued)

*Primary Examiner* — Matthew G Marini
(74) *Attorney, Agent, or Firm* — Jeffrey D. Frantz

(57) ABSTRACT

A method includes receiving seismic training data comprising a plurality of images each including a plurality of traces, predicting a location of a feature in at least some of the plurality of traces based on a location of an amplitude peak therein, applying labels to the locations, classifying pixels of the plurality of images as representing the feature or not representing the feature, using a semantic segmentation model, adjusting the labels based on the classification of the pixels, training, using the adjusted labels and the seismic training data, a machine-learning model to identify the feature, and identifying the feature in a different seismic data set using the trained machine-learning model.

20 Claims, 10 Drawing Sheets

(56) References Cited

U.S. PATENT DOCUMENTS

| | | | |
|---|---|---|---|
| 10,215,868 B2* | 2/2019 | Nguyen | G01V 1/308 |
| 2006/0029275 A1* | 2/2006 | Li | G06V 10/28 |
| | | | 382/218 |
| 2017/0254910 A1* | 9/2017 | Can | G01V 1/301 |
| 2018/0300576 A1 | 10/2018 | Dalyac et al. | |
| 2019/0169962 A1 | 6/2019 | Aqrawi et al. | |
| 2019/0383965 A1* | 12/2019 | Salman | G01V 3/18 |

OTHER PUBLICATIONS

Yu et al., "Automatic Horizon Picking In 3D Seismic Data Using Optical Filters And Minimum Spanning Tree (Patent Pending)", SEG Technical Program Expanded Abstracts, SEG San Antonio 2011 Annual Meeting, pp. 965-969.

Li et al., "Semi-Supervised Deep Machine Learning Assisted Seismic Image Segmentation and Stratigraphic Sequence Interpretation", 81st EAGE Conference and Exhibition 2019, vol. 2019, No. 1, pp. 1-6, Jun. 2019.

Wu et al., "Semiautomatic First-Arrival Picking of Microseismic Events by Using the Pixel-Wise Convolutional Image Segmentation Method", Geophysics, vol. 84, No. 3, pp. V143-V155, Mar. 11, 2019.

Babakhin et al., "Semi-Supervised Segmentation of Salt Bodies in Seismic Images using an Ensemble of Convolutional Neural Networks", arXiv Preprint arXiv:1904.04445v3, Aug. 2019, 15 pages.

Civitarese et al., "Semantic Segmentation of Seismic Images", arXiv prepring arXiv: 1905.04307v1, May 2019, 8 pages.

Alaudah et al., "Weakly-Supervised Semantic Labeling of Migrated Seismic Data", PhD Thesis, Georgia Institute of Technology, Aug. 2019, 201 pages.

Search Report and Written Opinion of International Patent Application No. PCT/US2020/070626 issued on Dec. 21, 2020; 10 pages.

Search Report and Written Opinion of International Patent Application No. PCT/US2020/070626 issued on Apr. 28, 2022; 7 pages.

Extended Search Report issued in European Patent Application No. 20877304.4 dated Sep. 22, 2023, 8 pages.

Jiang, Y. et al., "Detecting Geological Structures in Seismic Volumes Using Deep Convolutionai Neural Networks", Master Thesis, 2017, 76 pages.

Hu, L. et al., "U-net convolutional networks for first arrival picking", SEG 2018 Workshop, SEG Maximizing Asset Value Through Artificial Intelligence and Machine Learning, Beijing, China, 2018, 4 pages.

Communication pursuant to Article 94(3) issued in European Patent Application No. 20877304.4 dated Feb. 19, 2025, 8 pages.

* cited by examiner

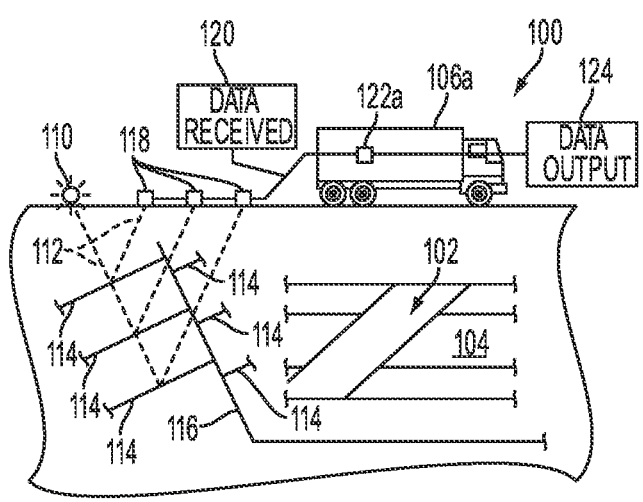
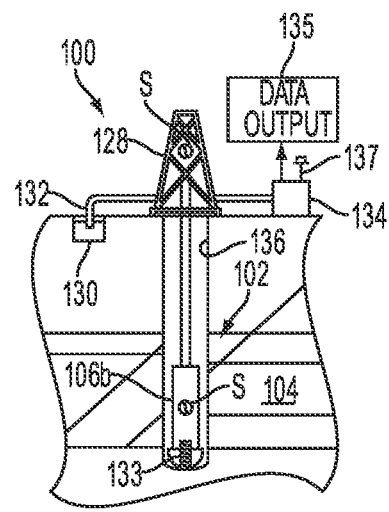
FIG. 1A  FIG. 1B
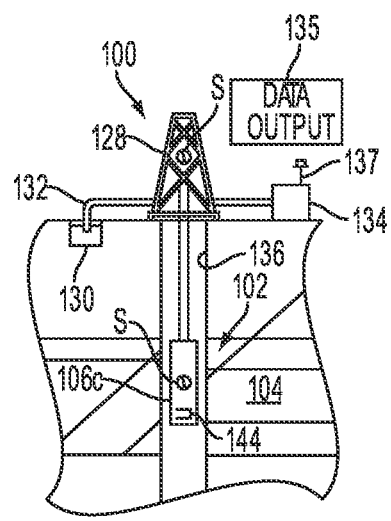
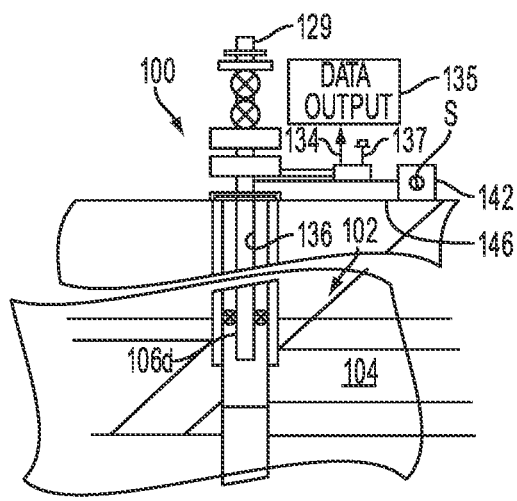
FIG. 1C  FIG. 1D

FEATURE DETECTION IN SEISMIC DATA

CROSS-REFERENCE TO RELATED APPLICATIONS

This application is a National Stage Entry of International Application No. PCT/US2020/070626, filed on Oct. 7, 2020, which claims priority to U.S. Provisional Patent Application having Ser. No. 62/914,608, which was filed on Oct. 14, 2019, and is incorporated by reference herein in its entirety.

BACKGROUND

In subterranean exploration, seismic data may be collected and analyzed to make inferences about the geology and structure of the rock formations below the ground. The raw seismic data is generally gathered as traces, which plot signals received by geophones, streamers, etc. A vast amount of data can be collected and inferred from these signals, which provides insight into the subterranean domain. For example, when the traces are aligned and processed so that they represent generally the same depths, peaks can be identified that represent features in the earth, based on reflections.

Seismic data may be used in marine/offshore contexts as well. As such, the sea floor represents one feature that appears in the seismic traces, as the sea floor generates one or more reflections recorded by the geophones. In the past, seismologists reviewed the seismic traces, with the assistance of signal processing, to identify features such as the sea floor from the seismic data. Recently, artificial intelligence (e.g., a neural network) has been used to supplant at least some of the human review; however, the artificial intelligence generally is trained using labeled training data. The training data is manually labeled by humans, and thus is expensive and time-consuming to produce, reducing the efficiency gains realized by the use of artificial intelligence.

SUMMARY

Embodiments of the disclosure provide a method including receiving seismic training data comprising a plurality of images each including a plurality of traces, predicting a location of a feature in at least some of the plurality of traces based on a location of an amplitude peak therein, applying labels to the locations, classifying pixels of the plurality of images as representing the feature or not representing the feature, using a semantic segmentation model, adjusting the labels based on the classification of the pixels, training, using the adjusted labels and the seismic training data, a machine-learning model to identify the feature, and identifying the feature in a different seismic data set using the trained machine-learning model.

Embodiments of the disclosure also provide a computing system including one or more processors, and a memory system including one or more non-transitory computer-readable media storing instructions that, when executed by at least one of the one or more processors, cause the computing system to perform operations. The operations include receiving seismic training data comprising a plurality of images each including a plurality of traces, predicting a location of a feature in at least some of the plurality of traces based on a location of an amplitude peak therein, applying labels to the locations, classifying pixels of the plurality of images as representing the feature or not representing the feature, using a semantic segmentation model, adjusting the labels based on the classification of the pixels, training, using the adjusted labels and the seismic training data, a machine-learning model to identify the feature, and identifying the feature in a different seismic data set using the trained machine-learning model.

Embodiments of the disclosure further provide a non-transitory computer-readable medium storing instructions that, when executed by at least one of the one or more processors, cause the computing system to perform operations. The operations include receiving seismic training data comprising a plurality of images each including a plurality of traces, predicting a location of a feature in at least some of the plurality of traces based on a location of an amplitude peak therein, applying labels to the locations, classifying pixels of the plurality of images as representing the feature or not representing the feature, using a semantic segmentation model, adjusting the labels based on the classification of the pixels, training, using the adjusted labels and the seismic training data, a machine-learning model to identify the feature, and identifying the feature in a different seismic data set using the trained machine-learning model.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
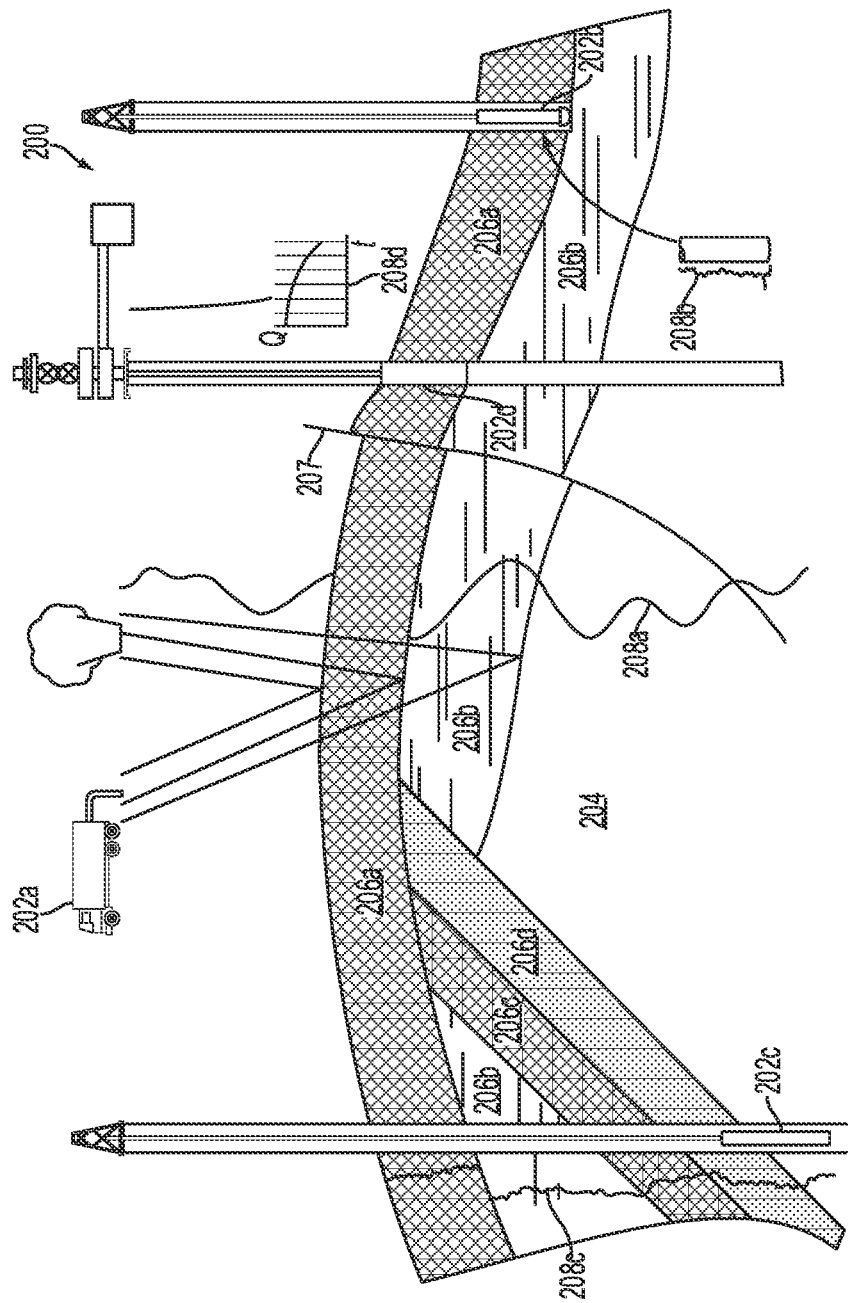

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electromagnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106*c* suspended by rig 128 and into wellbore 136 of FIG. 1B. Wireline tool 106*c* is adapted for deployment into wellbore 136 for generating well logs, performing downhole tests and/or collecting samples. Wireline tool 106*c* may be used to provide another method and apparatus for performing a seismic survey operation. Wireline tool 106*c* may, for example, have an explosive, radioactive, electrical, or acoustic energy source 144 that sends and/or receives electrical signals to surrounding subterranean formations 102 and fluids therein.

Wireline tool 106*c* may be operatively connected to, for example, geophones 118 and a computer 122*a* of a seismic truck 106*a* of FIG. 1A. Wireline tool 106*c* may also provide data to surface unit 134. Surface unit 134 may collect data generated during the wireline operation and may produce data output 135 that may be stored or transmitted. Wireline tool 106*c* may be positioned at various depths in the wellbore 136 to provide a survey or other information relating to the subterranean formation 102.

Sensors(S), such as gauges, may be positioned about oilfield 100 to collect data relating to various field operations as described previously. As shown, sensor S is positioned in wireline tool 106*c* to measure downhole parameters which relate to, for example porosity, permeability, fluid composition and/or other parameters of the field operation.

FIG. 1D illustrates a production operation being performed by production tool 106*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1D, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that typically provides a resistivity or other measurement of the formation at various depths.

A production decline curve or graph 208*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206*a*, a carbonate layer 206*b*, a shale layer 206*c* and a sand layer 206*d*. A fault 207 extends through the shale layer 206.1 and the carbonate layer 206*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208.2 and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
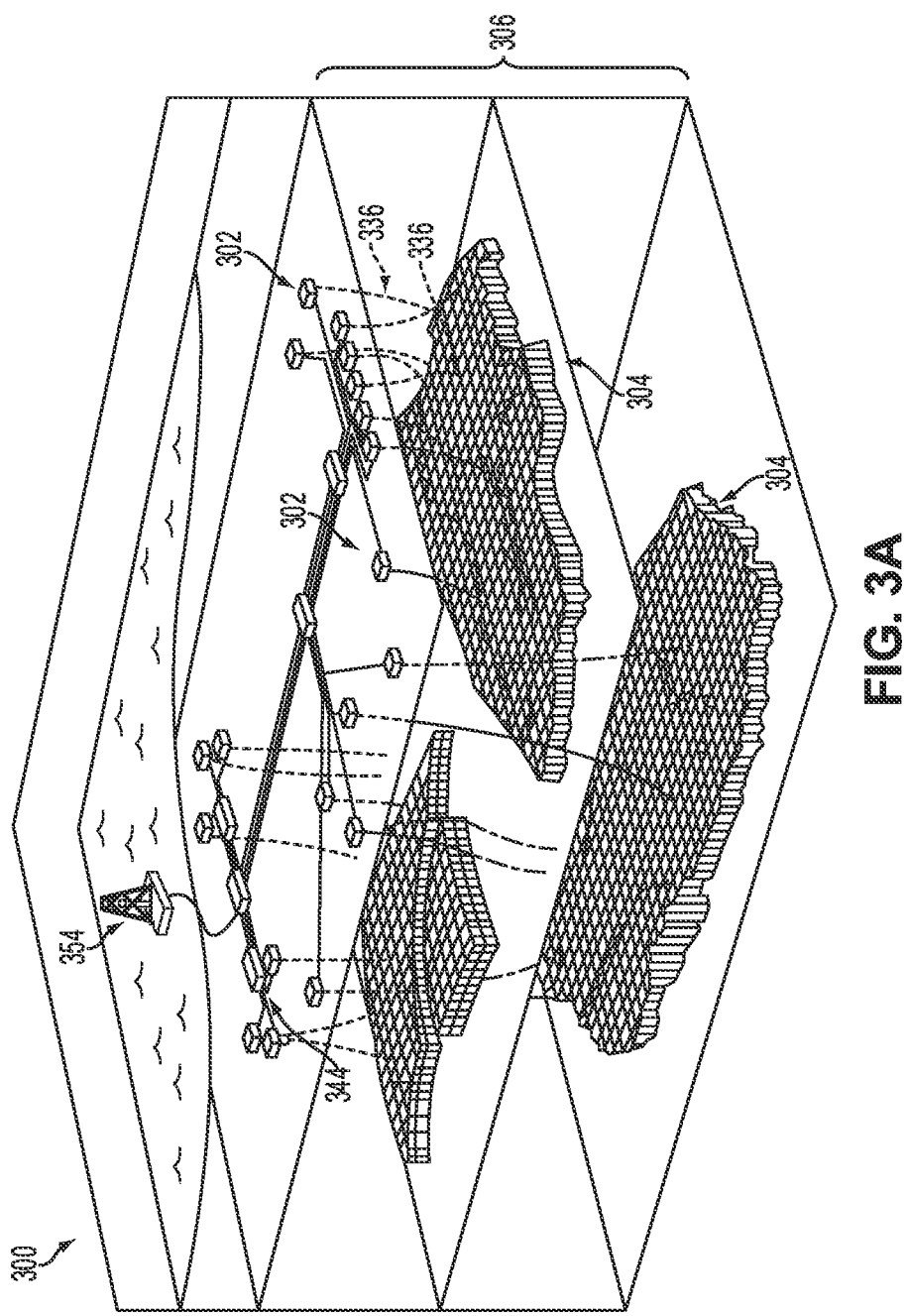

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
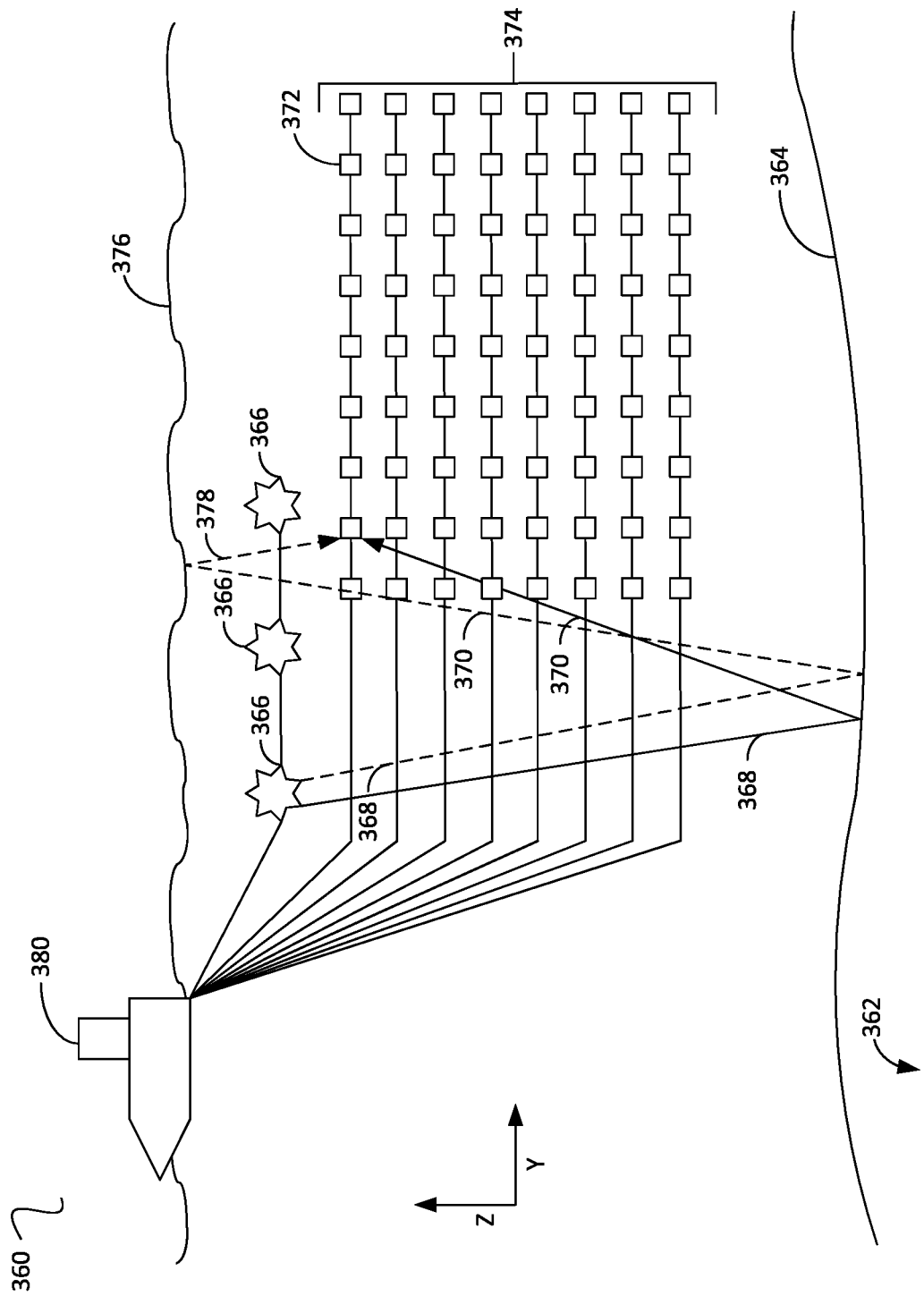

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362. Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4A:
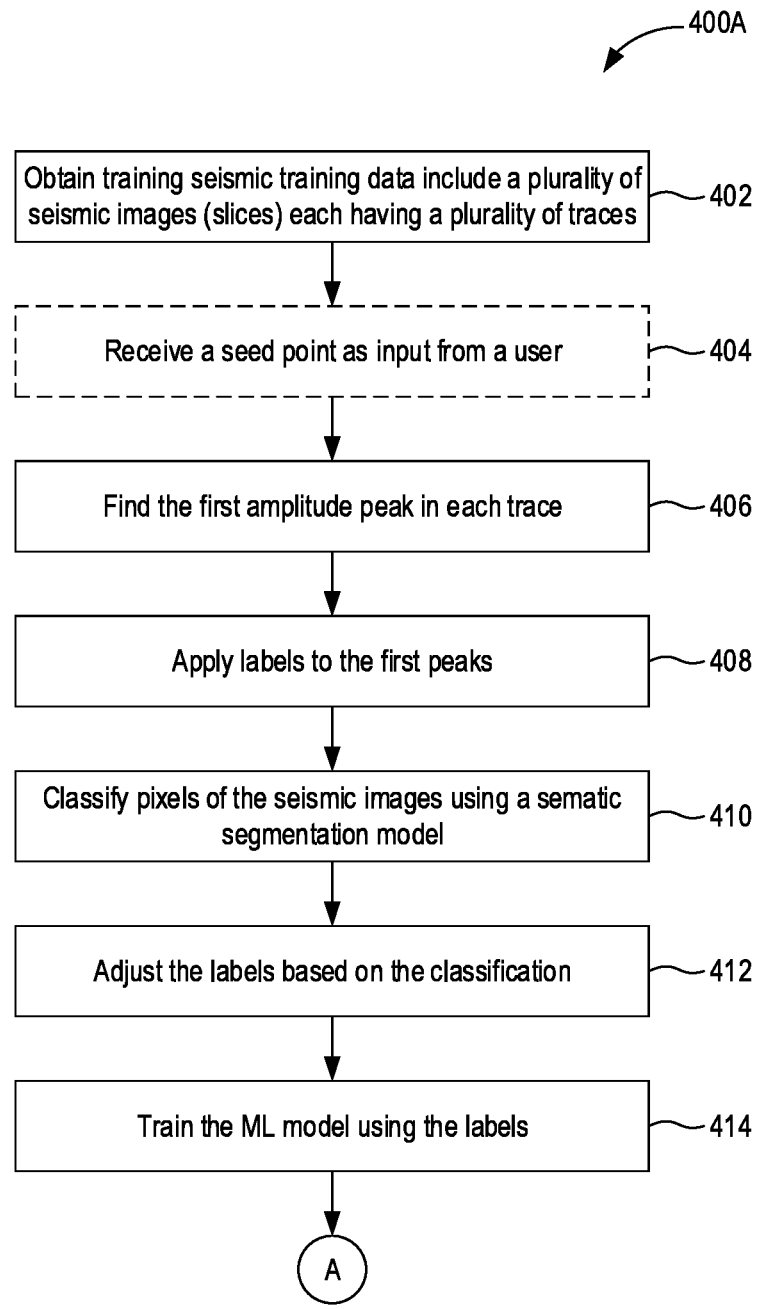
FIGS. 4A and 4B illustrate a flowchart of a method for training and implementing a machine-learning model to predict a feature in a subterranean formation represented in a seismic data set, according to an embodiment.
Figure 4B:
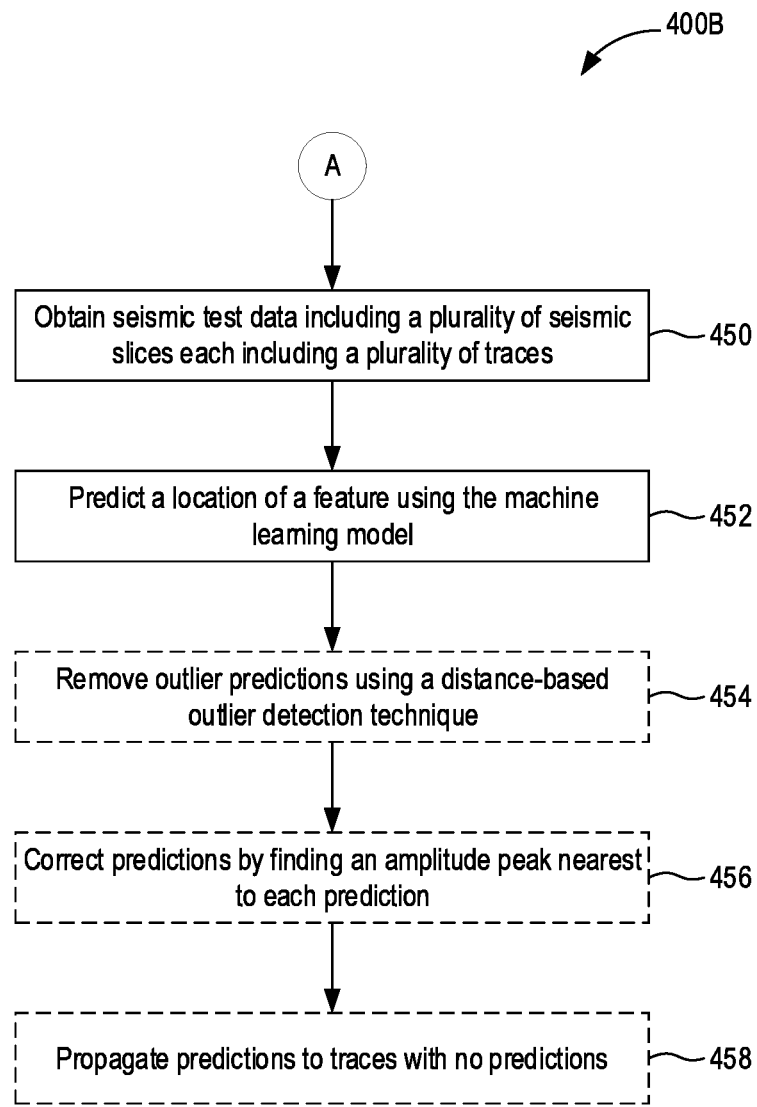

FIGS. 4A and 4B illustrate a flowchart of a method for detecting a feature in seismic data, e.g., using a machine-learning model, according to an embodiment. In some embodiments, the feature to be detected (i.e., the "target" feature) in the seismic data may be the sea floor, but in other embodiments, may be other types of features. Thus, although the present method is generally described in the context of finding the sea floor using artificial intelligence, it will be appreciated that the method may be readily tailored for use in finding other types of features. Further, it will be appreciated that various worksteps of the method described herein may be combined, executed in a different order than described, separated into two or more worksteps, and/or executed in parallel without departing from the scope of the present disclosure.

In an embodiment, the method may generally include two stages: a training stage 400A depicted in FIG. 4A, and a prediction stage 400B depicted in FIG. 4B. The training stage 400A may generally be conducted such that it is not visible to or interactive with end-users. Rather, the training stage 400A may result in a trained machine-learning model that may be provided to end-users for implementation on real-world seismic data in the prediction stage 400B.

The training stage 400A may include receiving training seismic data, as at 402. Such seismic data may include two-dimensional "slices" or images, each made up of seismic traces, e.g., seismic data recorded by geophones, hydrophones, etc. The training seismic data may be real data, e.g., available in public or proprietary libraries, and/or may be synthetic seismic data generated using a modeled subsurface. The seismic data may undergo many different processing steps, potentially before or after the present method, in order to generate an accurate model of the subsurface, find attributes thereof relevant to exploration, drilling, or other activities.

Having received the training seismic data at 402, the training stage 400A may then include, in some embodiments, receiving an input of a seed point in the seismic data as input from a human user, as at 404. It is emphasized that this aspect of the method is optional, as indicated by the dashed lines, although any of the other worksteps discussed herein could also be omitted in various embodiments, without departing from the scope of the present disclosure. The seed input may be provided by a human user viewing the slice, e.g., as a point where the user believes the seismic slice indicates a feature, e.g., the sea floor. This may provide a starting point for the labeling process in the training stage 400A. For example, the seed point may be selected near to an amplitude spike in the traces, e.g., a first amplitude spike in the depth direction. In other embodiments, the training stage may not include receiving a seed point, and may instead proceed by searching in the seismic data starting an any suitable point.

The training stage 400A may then proceed to finding an amplitude peak in one, some, or each of the traces, as at 406. As the term is used herein, a peaks can represent a local maximum absolute value or a local minimum (e.g., a traditional "peak" or "trough"). For example, in a marine context, the first amplitude peak (e.g., in the depth direction) may generally be expected to represent the sea floor, and thus in embodiments in which the sea floor is the targeted feature, the first amplitude peak may be sought in block 404. Finding of the first amplitude peak may proceed in an automated fashion, by reviewing the dataset for each "pixel" (or other discrete element) of an individual trace until the desired peak is observed. However, even in such a marine context, the first amplitude peak in a given trace might not actually represent the sea floor. Noise or other factors may result in the first amplitude peak not representing the sea floor.

The training stage 400A may then proceed to applying labels to the found peaks (e.g., first peaks), as at 408. The found peaks may be considered to identify a common feature, e.g., as noted above, the sea floor. Accordingly, a location within each trace, if the traces have sufficient data, may be labeled as representing the sea floor. These labels are considered and referred to herein as "weak" labels, as there is a high degree of uncertainty as to whether the identified peak actually represents the targeted feature, as noted above. In some instances, the uncertainty can be 40%-60%, for example, a maximum of 50%.

The training stage 400A may then proceed to classifying the pixels of the seismic images using a semantic segmentation model, as at 410. Semantic segmentation models are neural networks trained to classify pixels in an image as pertaining to a type of object, but not to discriminate between instances of the same object. In this method, the segmentation model may be a binary segmentation problem: either a pixel is classified as representing the targeted feature (e.g., sea floor) or it is not.

The results of the binary segmentation applied to the individual seismic images may then be compared with the labels applied at 408. If the labels match the classification, the label is confirmed. If it does not, the label may be deleted or moved to a location that is part of the trace that the segmentation model indicates as being part (e.g., a boundary) of the feature, resulting in an adjustment to the set of labels, as at 412.

For example, a label may be associated with a location in the seismic image, in particular, part of a trace. The seismic image is made up of pixels, each associated with a discrete area of the seismic image. Accordingly, the location associated with the label is represented by a pixel in the image. If the pixel representing the location associated with the label is classified as representing the feature, then the segmentation model may be considered to agree with the location of the label. If the pixel is classified as not representing the feature, then the segmentation model may be considered to disagree with the location of the label. The location associated with the label may then be moved to a pixel that the segmentation model classifies as representing the feature, which still represents the same trace. More specifically, the location may be in a boundary pixel, where one or more neighbors to the pixel are classified as not representing the feature. Similarly, in some embodiments, if the location associated with the label is not represented by a boundary pixel, the location may be changed to the nearest boundary pixel that contains the same trace.

This approach may be iterative, with the labels being applied and then verified potentially many times. A human user could also intervene to confirm or correct labels, classifications, or both. Generally, however, the training stage 400A may not rely on or even include human intervention, e.g., except, in some embodiments, to receive seed point inputs.

Once the labels are created and verified by agreement between the segmentation model and the peak-identification label-generation technique, the resulting labeled data set may be used to train a machine-learning model. Accordingly, the training stage 400A may conclude by training the machine-learning model to identify the targeted feature (e.g., sea floor) in other, similar sets of seismic data, as at 414.

Once the machine-learning model is trained, the method may proceed to the second stage, which is the deployment of the machine learning model to predict the location of features within collected seismic data, e.g., the "prediction" stage 400B of FIG. 4B. The prediction stage 400B may begin by receiving seismic test data, as at 450. The seismic data received at 450 may be similar to the seismic data received at 400, e.g., it may include seismic slices, of a similar resolution, describing at least a somewhat similar geological area. These slices or images may be fed to the machine-learning model, which may predict the location(s) of feature(s) in the images, as at 452.

In some embodiments, this may conclude the prediction stage, and the machine-learning model may output the labeled dataset, which may be used by the end-users for subsequent processing and/or image generation in support of exploration, drilling, production, etc. For example, the seismic images, labeled as provided at 452, may be used to create a three-dimensional model of the subterranean domain, e.g., with an accurate location of the feature (e.g., sea floor) being automatically recognized and provided in the model (e.g., as a visualization thereof) in accordance with the present disclosure.

In other embodiments, the prediction stage 400B may include one or more post-processing features. Again, the dashed boxes in FIG. 4B emphasize that the following worksteps are optional, with it being understood, however, that the worksteps represented as solid-boxes could also be omitted or combined in various embodiments. In an embodiment, the prediction stage 400B may include identifying and removing any outliers present in the predictions, as at 454. For example, pattern recognition can be used to exclude predictions in traces (or slices) that are unlikely. For example, a distance-based outlier detection may be used to identify outliers. In such a detection process, the predictions may be clustered into one or more clusters, and a centroid of the cluster defined. A distance from the centroid may be used to determine which predictions are unlikely. In other embodiments, density-based or any other, e.g., more sophisticated, outlier detection methods may be employed, with the distance-based technique presented herein merely by way of an illustrative example.

Further, in some embodiments, the prediction stage 400B may include correcting predictions by finding an amplitude peak nearest to the individual predictions, as at 456. This is described in greater detail below, but, by way of introduction, a window of predefined or dynamically-determined dimensions may be formed, e.g., a pixel representing the location of a predicted boundary of the feature. The method may include searching the window to determine if the amplitude of the trace is higher in another pixel included in the window. If it is, the label for the prediction is moved to the pixel representing the higher amplitude.

Further, in some embodiments, the prediction stage 400B may include propagating predictions to traces that lack predictions, as at 458. For example, there may be some traces for which data is insufficient (e.g., gaps where data is missing) or noise obscures peaks, such that the machine-learning model did not establish a prediction, or at least did not establish a prediction with a high enough level of confidence. Accordingly, the predictions stage 400B may capitalize on the assumption than the boundary of the feature (e.g., the sea floor) is likely to be continuous. Accordingly, the method may extrapolate a prediction for one trace based on one or more neighbors thereof. In turn, this may be used to more efficiently create a more accurate seismic model of the subterranean environment. Such models may be used for exploration determinations of whether hydrocarbons are likely present in a subterranean region, well-planning (e.g., trajectory determinations), intervention, completion, production, and other well stages.

Figure 5:
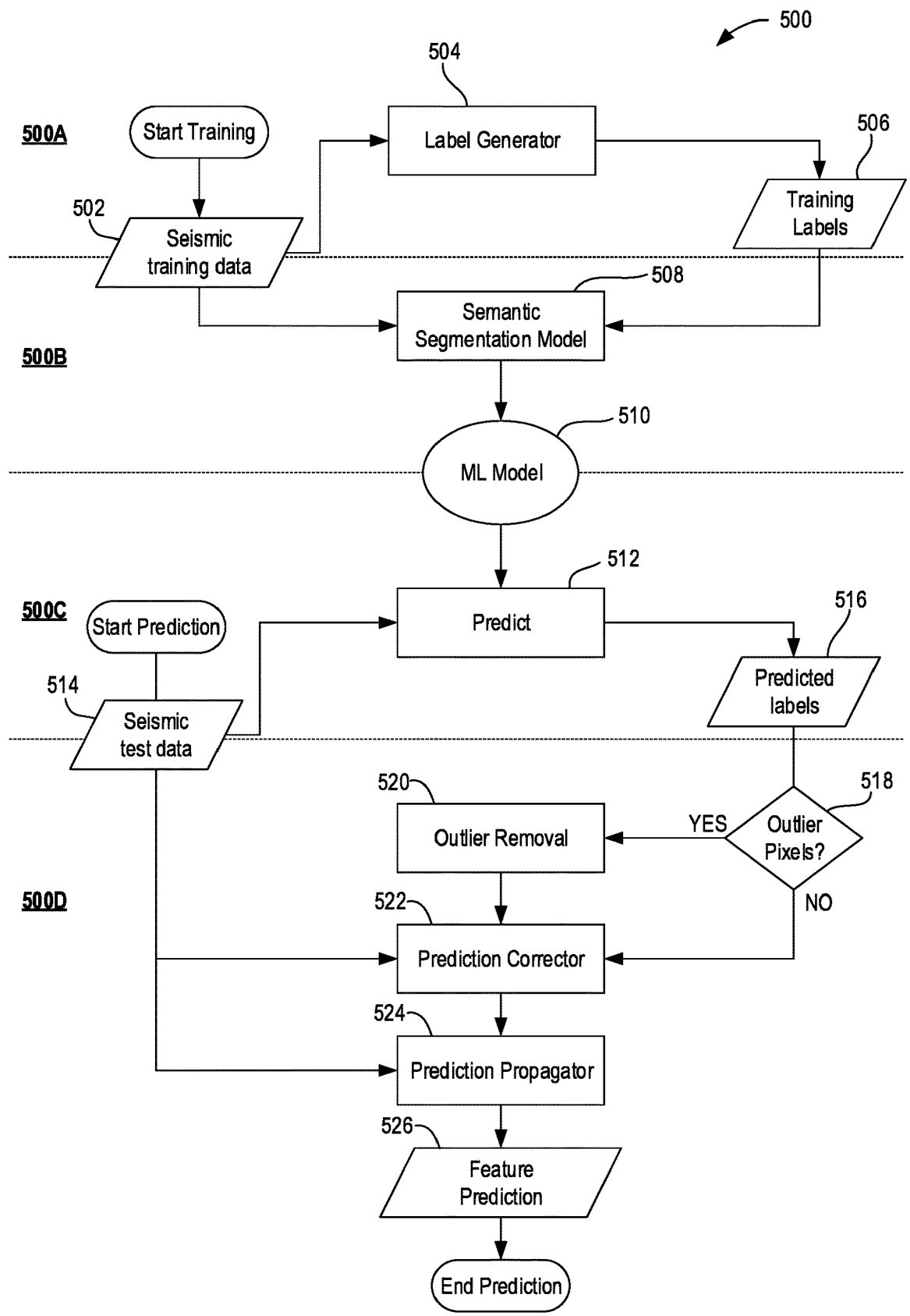
FIG. 5 illustrates a flowchart of a method for using a machine-learning model to predict a sea-floor boundary, according to an embodiment.

FIG. 5 illustrates a flowchart of a method 500 for using a machine-learning (ML) model to predict a sea-floor boundary, according to an embodiment. Although prediction of a sea-floor boundary is discussed herein, it will be appreciated that this is but one example of a possible feature that may be identified using the method. Other features to identify may include a "top of salt", which may not be the first peak of the signal, but the method 500 may employ cropping or other pre-processing to facilitate location of such features in the signals.

In an example of the method 500, the sea-floor interpretation problem is formulated as a binary segmentation problem, in which each pixel is identified as a sea-floor pixel or non-sea-floor pixel. The method 500 is generally broken into two parts: training stage and prediction stage. The training stage includes a generator tier 500A and a training tier 500B. In the generator tier 500A, seismic training data is received at 502, and a label generator 504 (e.g. a processor) determines "weak" labels 506 of sea floor or non-sea floor, e.g., not by a human. The weak labels are determined, for example, by finding amplitude peaks in the traces of the seismic data. The labels are thus "weak" in the sense that their accuracy may be relatively low, e.g., on the order of 40-60% accurate, as the model is initially untrained on the specific seismic data under analysis.

Next, in the training tier 500B, a semantic segmentation model 508 is used to classify the pixels of the training seismic images into either sea floor or non-sea floor. This classification from the segmentation model is then compared with the labels 506 to generate the training dataset. This training dataset is then used to train the machine learning model, as at 510.

Moving to the implementation/prediction stage, in a prediction tier 500C, the machine learning model 510 is used, at 512, to predict sea-floor/non-sea-floor pixels in test seismic data received at 514. The machine-learning model is not revised or retrained for this new seismic data unless the test data distribution does not match a training data distribution. The result of the prediction at 512 using the machine learning model 510 may be predicted labels 516.

In the post-processing tier 500D, post-processing techniques are applied to the predicted labels 516 in the seismic data to enhance accuracy. In some embodiments, the post-processing techniques may be consistent across the datasets and may not call for interpreter intervention.

For example, the post-processing tier 500D may include outlier removal. This may be a conditional process, and thus the method may first include determining whether outlier pixels, where a feature boundary is predicted, exist, as at 518. The existence of outlier pixels may be determined based on any suitable outlier detection algorithm, e.g., a density- or distance-based algorithm, or the like. In the outlier removal stage, outlier pixels (if any) are removed at 520 from the sea-floor predictions generated in the prediction tier 500C at 512.

Further, a prediction corrector 522 may be used, which may improve the prediction so that it falls on a maximum peak or trough (e.g., a maximum amplitude or minimum amplitude, respectively). For example, the prediction corrector 522 may apply a moving window, e.g., centered on the individual predictions in each trace and find the predicted pixel (from the previous stage) for the traces and adjust its z (depth) value so as to correspond to the location of the maximum or minimum amplitude within the window.

Another post-processing operation may be performed by a prediction propagator 524. The prediction propagator 524 may extrapolate the prediction for the seismic traces to areas or traces where predictions were not made earlier. Iterating over each trace, those traces where there is no predicted pixel are identified. In an embodiment, to fill those missing predictions, the closest trace where there is a predicted pixel is identified by searching in both left and right direction. Once the trace with a predicted pixel is found, e.g., either in left or right direction, a fixed height window with predicted pixel as the mid-point and find the maximum peak or trough for the seismic trace where there is a missing prediction. Once the post-processing techniques have been applied, the results (identification of the sea floor, for example) are reported to the user, as a feature (e.g., sea floor) prediction 526. In at least some embodiments, the feature prediction may be employed to create a model of the subsurface, e.g., for noise mitigation and/or other subsequent processing. The seismic data, processed as provided herein, may be employed to generate digital models, e.g., three-dimensional models, of the subsurface in a more efficient and more accurate manner.

Figure 6:
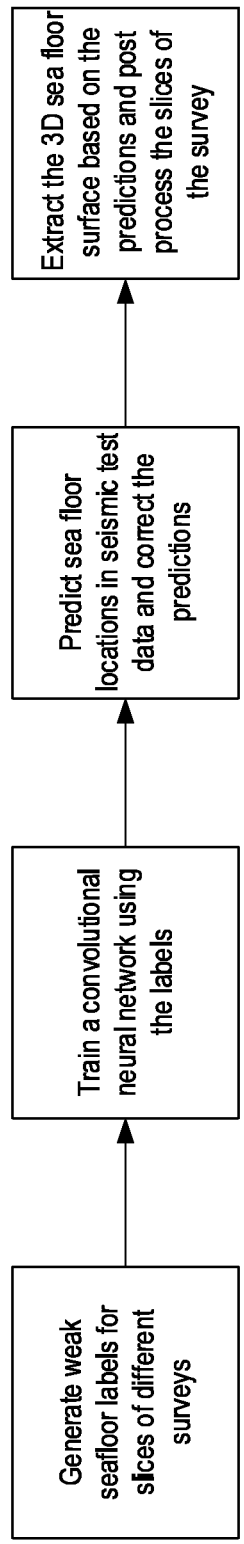
FIG. 6 illustrates a flow diagram of the high-level process flow, according to an embodiment.

FIG. 6 illustrates a flowchart of a high-level process flow of the method 500, according to an embodiment. The first stage is to generate weak seafloor labels for several slices of different public surveys. A batch of few (but diverse) seismic 2d slices may be used, and the first peak for each trace in the slice may be selected, although the accuracy of the selection may be relatively low or "weak" as mentioned above. The aim is to obtain weak labels, while the ML algorithm in the next phase may then autocorrect a majority of the false positives the generator determines in this phase. Note that a seed point (amplitude) is possibly used as input in the generator tier's algorithm. This non-automated process may be used in the training phase's generator tier, but may not be used elsewhere in the method. Further, such non-automated aspects may be masked from the end user because training and tuning of the machine happens offline. The deep convolutional neural network machine learns from weak labels and ultimately is capable of detecting 2D sea-floor boundary. The end-user experience may be fully automated and thus eliminates users providing a seed point/painting (or otherwise labeling a start of a sea floor or another feature of interest). A final 3D surface may then be extracted in PETREL® or another software platform after post processing.

Figure 7:
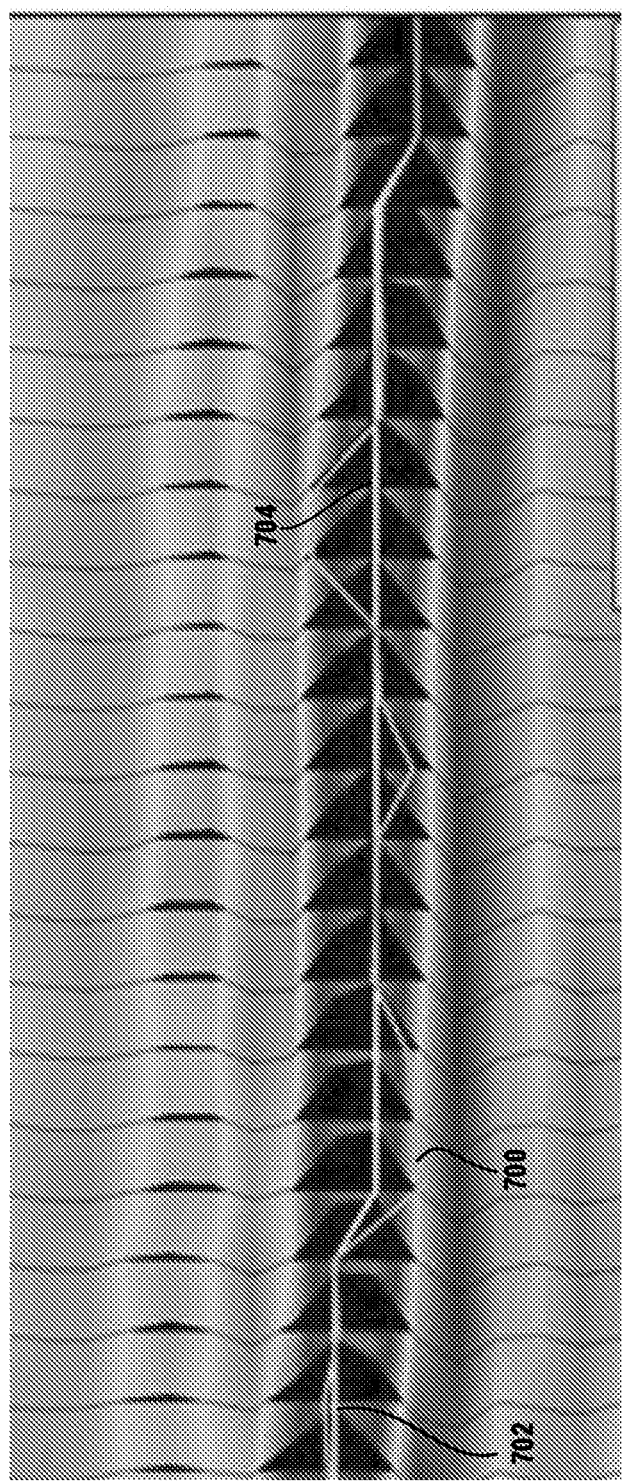
FIG. 7 illustrates an operation of a prediction corrector, according to an embodiment.

FIG. 7 illustrates an example of the operation of the prediction corrector 522, according to an embodiment. In particular, FIG. 7 shows the initial prediction by the machine-learning model 510 as line 700. FIG. 7 also shows the prediction corrector output as line 702. The lines 700, 702 are shown against the background of a section of traces in a seismic image, with the peak amplitude indicated, e.g., at 704. As shown, the prediction by the machine-learning model 510 may not reliably fall on the maximum peak, although it is close to it. Accordingly, the prediction corrector 522 may be employed, e.g., using a moving window that is centered on each machine-learning prediction, to find the maximum amplitude in the region proximal to the prediction. As a consequence, the prediction corrector 522 may force the correction to or at least toward the maximum amplitude, as shown, and thus, increases the accuracy of the result.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
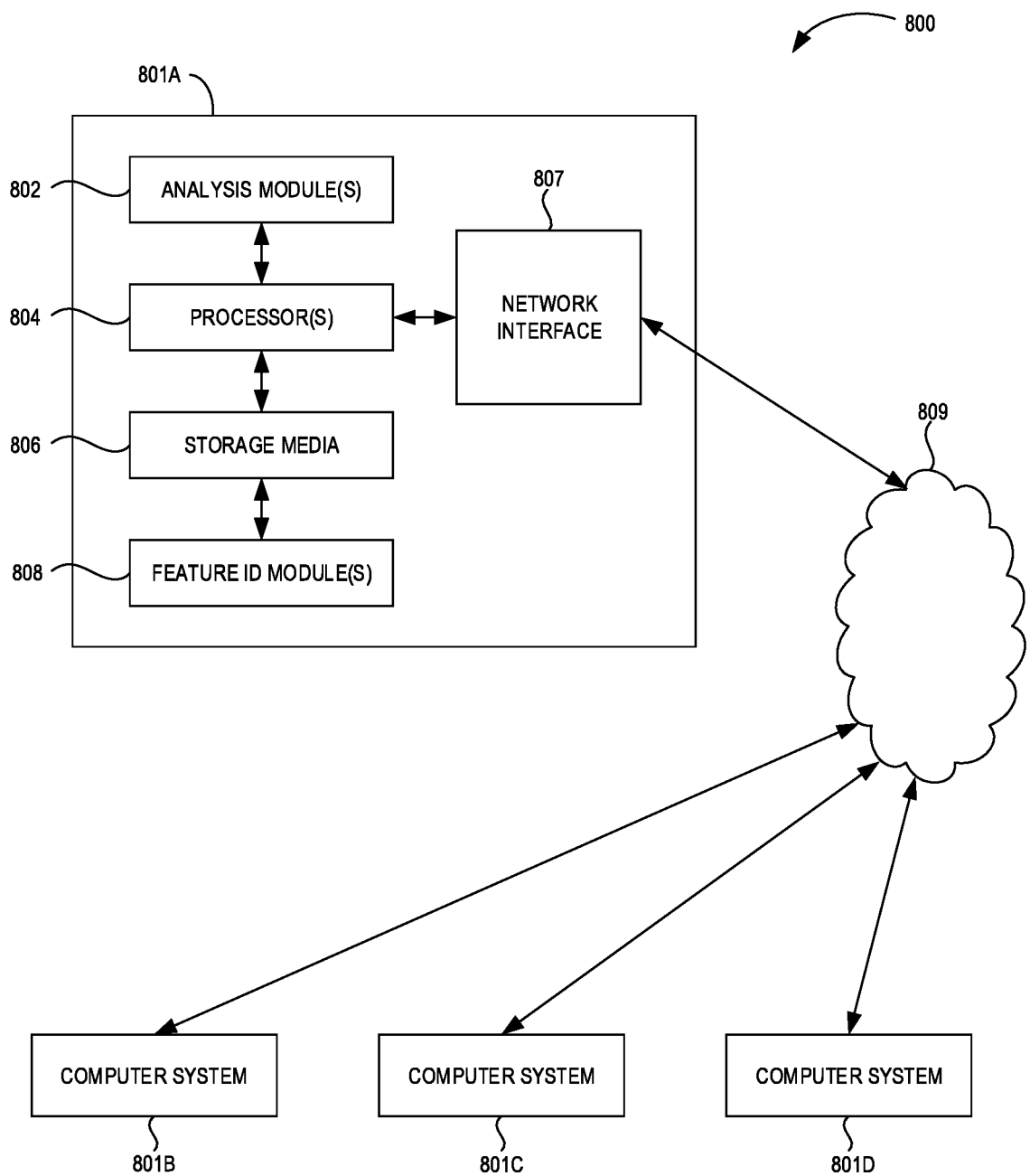
FIG. 8 illustrates a schematic view of a computing system, according to an embodiment.

In some embodiments, any of the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more feature identification module(s) 808. In the example of computing system 800, computer system 801A includes the feature identification module 808. In some embodiments, a single feature identification module may be used to perform some or all aspects of one or more embodiments of the methods. In alternate embodiments, a plurality of feature identification modules may be used to perform some or all aspects of methods.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:
receiving seismic training data comprising a plurality of images each including a plurality of traces;
predicting a geographic location of a feature in at least some of the plurality of traces based on a graphical location of a maximum of an amplitude peak therein, wherein the geographic location identifies the feature as comprising a sea floor or not comprising a sea floor;
applying a respective geographic label to each geographic location, wherein the geographic labels identify the geographic locations as comprising the sea floor or not comprising the sea floor;
classifying pixels of the plurality of images as representing the feature or not representing the feature, using a semantic segmentation model;
adjusting the geographic labels based on the classification of the pixels;
training, using the adjusted geographic labels and the seismic training data, a machine-learning model to identify the feature;
identifying the feature in a different seismic data set using the trained machine-learning model; and
modifying a drilling plan based on the identified features as determined by the trained machine-learning model.

2. The method of claim 1, wherein the adjusting the geographic labels comprises changing the geographic location associated with one of the geographic labels, or removing the one of the geographic labels, in response to a pixel of the pixels that is associated with the geographic location being classified as not representing the feature.

3. The method of claim 1, wherein:
the feature comprises the sea floor; and
the predicting the geographic location of the feature in each of the plurality of traces based on the graphical location of the amplitude peak therein comprises finding a first amplitude peak in a depth direction in each of the traces.

4. The method of claim 1, further comprising:
receiving a seed point identification from a human user, wherein the predicting the geographic location comprises searching for the amplitude peak beginning at the seed point.

5. The method of claim 1, further comprising:
defining a window in the different seismic data set, the window being centered on a pixel in a trace of an image of the different seismic data set, the identifying the feature comprising labeling the pixel as representing the feature;
finding a maximum or minimum amplitude of the trace in the window; and
adjusting the geographic location of the geographic label to a different pixel, the different pixel representing a graphical location of the maximum or minimum amplitude of the trace in the window.

6. The method of claim 1, wherein:
the identifying the feature in the different seismic data set using the machine-learning model comprises generating a set of predictions for geographic locations of the feature in the seismic data; and
the method further comprises:
detecting an outlier in the set of predictions; and
adjusting the set of predictions to remove the outlier.

7. The method of claim 1, wherein:
the identifying the feature in the different seismic data set using the machine-learning model comprises leaving one or more traces without a prediction; and
the method further comprises extrapolating a prediction for the one or more traces without a prediction based on a prediction for one or more neighboring traces.

8. A computing system, comprising:
one or more processors; and
a memory system comprising one or more non-transitory computer-readable media storing instructions that, when executed by at least one of the one or more processors, cause the computing system to perform operations, the operations comprising:
receiving seismic training data comprising a plurality of images each including a plurality of traces;
predicting a geographic location of a feature in at least some of the plurality of traces based on a graphical location of a maximum of an amplitude peak therein, wherein the geographic location identifies the feature as comprising a sea floor or not comprising a sea floor;
applying a respective geographic label to each geographic location, wherein the geographic labels identify the geographic locations as comprising the sea floor or not comprising the sea floor;
classifying pixels of the plurality of images as representing the feature or not representing the feature, using a semantic segmentation model;

adjusting the geographic labels based on the classification of the pixels;

training, using the adjusted geographic labels and the seismic training data, a machine-learning model to identify the feature;

identifying the feature in a different seismic data set using the trained machine-learning model; and modifying a drilling plan based on the identified features as determined by the trained machine-learning model.

9. The computing system of claim 8, wherein the adjusting the geographic labels comprises changing the geographic location associated with one of the geographic labels, or removing the one of the geographic labels, in response to a pixel of the pixels that is associated with the geographic location being classified as not representing the feature.

10. The computing system of claim 8, wherein:
the feature comprises the sea floor; and
the predicting the geographic location of the feature in each of the plurality of traces based on the graphical location of the amplitude peak therein comprises finding a first amplitude peak in a depth direction in each of the traces.

11. The computing system of claim 8, wherein:
the operations further comprise receiving a seed point identification from a human user; and
the predicting the geographic location comprises searching for the amplitude peak beginning at the seed point.

12. The computing system of claim 8, wherein the operations further comprise:
defining a window in the different seismic data set, the window being centered on a pixel in a trace of an image of the different seismic data set, the identifying the feature comprising labeling the pixel as representing the feature;
finding a maximum or minimum amplitude of the trace in the window; and
adjusting the geographic location of the geographic label to a different pixel, the different pixel representing a graphical location of the maximum or minimum amplitude of the trace in the window.

13. The computing system of claim 8, wherein:
the identifying the feature in the different seismic data set using the machine-learning model comprises generating a set of predictions for geographic locations of the feature in the seismic data; and
the operations further comprise:
detecting an outlier in the set of predictions; and
adjusting the set of predictions to remove the outlier.

14. The computing system of claim 8, wherein:
the identifying the feature in the different seismic data set using the machine-learning model comprises leaving one or more traces without a prediction; and
the operations further comprise extrapolating a prediction for the one or more traces without a prediction based on a prediction for one or more neighboring traces.

15. A non-transitory computer-readable medium storing instructions that, when executed by at least one processors of a computing system, cause the computing system to perform operations, the operations comprising:
receiving seismic training data comprising a plurality of images each including a plurality of traces;

predicting a geographic location of a feature in at least some of the plurality of traces based on a graphical location of a maximum of an amplitude peak therein, wherein the geographic location identifies the feature as comprising a sea floor or not comprising a sea floor;

applying a respective geographic label to each geographic location, wherein the geographic labels identify the geographic locations as comprising the sea floor or not comprising the sea floor;

classifying pixels of the plurality of images as representing the feature or not representing the feature, using a semantic segmentation model;

adjusting the geographic labels based on the classification of the pixels;

training, using the adjusted geographic labels and the seismic training data, a machine-learning model to identify the feature;

identifying the feature in a different seismic data set using the trained machine-learning model; and modifying a drilling plan based on the identified features as determined by the trained machine-learning model.

16. The medium of claim 15, wherein the adjusting the geographic labels comprises changing the geographic location associated with one of the geographic labels, or removing the one of the geographic labels, in response to a pixel of the pixels that is associated with the geographic location being classified as not representing the feature.

17. The medium of claim 15, wherein:
the feature comprises the sea floor; and
the predicting the geographic location of the feature in each of the plurality of traces based on the graphical location of the amplitude peak therein comprises finding a first amplitude peak in a depth direction in each of the traces.

18. The medium of claim 15, wherein:
the operations further comprise receiving a seed point identification from a human user; and
the predicting the geographic location comprises searching for the amplitude peak beginning at the seed point.

19. The medium of claim 15, wherein the operations further comprise:
defining a window in the different seismic data set, the window being centered on a pixel in a trace of an image of the different seismic data set, the identifying the feature comprising labeling the pixel as representing the feature;
finding a maximum or minimum amplitude of the trace in the window; and
adjusting the geographic location of the geographic label to a different pixel, the different pixel representing a graphical location of the maximum or minimum amplitude of the trace in the window.

20. The medium of claim 15, wherein:
the identifying the feature in the different seismic data set using the machine-learning model comprises generating a set of predictions for geographic locations of the feature in the seismic data; and
the operations further comprise:
detecting an outlier in the set of predictions; and
adjusting the set of predictions to remove the outlier.

* * * * *